United States Patent [19]
Ludtke et al.

[11] Patent Number: 6,141,702
[45] Date of Patent: *Oct. 31, 2000

[54] MODEL AND COMMAND SET FOR AN AV/C-BASED DISC MEDIA PLAYER RECORDER

[75] Inventors: Harold Aaron Ludtke, San Jose, Calif.; Harumi Kawamura, Tokyo; Hiraku Inoue, Yokohamashi, both of Japan

[73] Assignees: Sony Corporation of Japan, Tokyo, Japan; Sony Electronics, Inc., Park Ridge, N.J.

[ * ] Notice: This patent is subject to a terminal disclaimer.

[21] Appl. No.: 09/108,870

[22] Filed: Jul. 1, 1998

Related U.S. Application Data

[60] Provisional application No. 60/054,258, Jul. 30, 1997.

[51] Int. Cl.$^7$ ...................................................... G06F 3/00
[52] U.S. Cl. .............................. 710/5; 709/200; 709/253; 713/1; 713/100; 707/101; 707/102
[58] Field of Search ..................... 707/101, 102; 455/6.2; 273/148; 708/860; 709/200, 253; 713/1, 400, 100; 710/5

[56] References Cited

U.S. PATENT DOCUMENTS

| | | | |
|---|---|---|---|
| 4,727,512 | 2/1988 | Birkner et al. | 364/900 |
| 5,119,465 | 6/1992 | Jack et al. | 395/500 |
| 5,282,621 | 2/1994 | Tseng | 273/148 |
| 5,530,852 | 6/1996 | Meske, Jr. et al. | 395/600 |
| 5,594,938 | 1/1997 | Engel | 455/6.2 |
| 5,627,997 | 5/1997 | Pearson et al. | 395/500 |
| 5,787,259 | 7/1998 | Haroun et al. | 395/200.83 |
| 5,845,283 | 12/1998 | Williams et al. | 707/101 |

FOREIGN PATENT DOCUMENTS

| | | | |
|---|---|---|---|
| 0 612 157 A2 | 8/1994 | European Pat. Off. | H05B 1/20 |
| 0 756 276 A1 | 1/1997 | European Pat. Off. | G11B 15/087 |
| 09120666 | 5/1997 | Japan | G11B 27/00 |

*Primary Examiner*—Paul R. Lintz
*Assistant Examiner*—Jibreel Speight
*Attorney, Agent, or Firm*—Wagner, Murabito & Hao LLP

[57] ABSTRACT

In a home audio visual network including a plurality of devices coupled via an IEEE 1394 bus, a system for accessing a media drive mechanism of a multi-item-type media player. The multi-item-type media player can play any type of disc media item. A media drive mechanism is included within the mutli-item-type media player and is configured to play or record the media item stored within the multi-item-type media player. A computer system is built-in to the multi-item-type media player. A software based media player model executes on the computer system, and in turn, causes the computer system to implement a method of accessing the media drive mechanism. In so doing, the computer system interfaces with a plurality of devices coupled to the multi-item media player via an IEEE 1394 communications link of an IEEE 1394 based network and provides a standardized command set for the media drive mechanism. The media player model provides a set of standardized commands that allow the plurality of devices on the network to access the media drive mechanism and thereby access the installed media item and control the functionality of the media drive mechanism.

23 Claims, 13 Drawing Sheets

| Disc Subunit Identifier Descriptor ||
|---|---|
| Address | Contents |
| $0000_{16}$ | Descriptor_length |
| $0001_{16}$ | |
| $0002_{16}$ | Number_of_root_object_lists (n) |
| $0003_{16}$ | |
| $0004_{16}$ | root_object_list_id_0 |
| $0005_{16}$ | |
| ⋮ | ⋮ |
| ⋮ | root_object_list_id_n-1 |
| ⋮ | |
| $XX\ XX_{16}$ | Disc_subunit_dependent_length |
| ⋮ | Disc_subunit_dependent_information |
| ⋮ | |
| $XX\ XX_{16}$ + Subunit_dependent_length | |
| $VV\ VV_{16}$ | Manufacturer_dependent_length |
| ⋮ | Manufacturer_dependent_information |
| ⋮ | |
| $YY\ YY_{16}$ + Manufacturer_dependent_length | |

FIG. 2

| Address | Contents |
|---|---|
| 00 01$_{16}$ | Attributes_of_subunit_independent_information |
| 00 05$_{16}$ | Number_of_supported_disc_types |
| 00 06$_{16}$ | Disc_type_specification_0 |
| ⋮ | ... |
| WWWW16 | Disc_type_specification_N |

FIG. 3

| Address | Contents |
|---|---|
| 01$_{16}$ | Disc_type |
| | |
| 03$_{16}$ | Type_dependent_length |
| ⋮ | Type_dependent_information |
| ⋮ | |
| 03$_{16}$ + Type_dependent_length | |

FIG. 4

| Disc_type (high) | Disc_type (low) | |
|---|---|---|
| CD (01$_{16}$) | CD-DA | (01$_{16}$) |
| | Video-CD | (02$_{16}$) |
| | DATA | (0E$_{16}$) |
| MD (03$_{16}$) | Premastered | (01$_{16}$) |
| | Recordable | (02$_{16}$) |
| | Hybrid | (03$_{16}$) |
| | DATA | (0E$_{16}$) |
| DVD (05$_{16}$) | Movie | (01$_{16}$) |
| | DATA | (0E$_{16}$) |

FIG. 5

| Audio Track List | $81_{16}$ | Objects in this list are the audio tracks on a disc. The Audio Track List represents a disc. Supporting these lists are optional. |
|---|---|---|
| Video Track List | | |

FIG. 6

| Audio Track List list_specific_information ||
|---|---|
| Address Offset | Contents |
| $00_{16}$ | List_specific_information_length |
| $01_{16}$ | |
| $02_{16}$ | Last_update |
| $03_{16}$ | |
| $04_{16}$ | |
| $05_{16}$ | |
| $06_{16}$ | (MSB) |
| $07_{16}$ | Disc_total_playback_time |
| $08_{16}$ | |
| $09_{16}$ | (LSB) |
| $0A_{16}$ | (MSB) |
| $0B_{16}$ | Disc_maximum_recording_capacity |
| $0C_{16}$ | |
| $0D_{16}$ | (LSB) |
| $0E_{16}$ | (MSB) |
| $0F_{16}$ | Disc_recording_remaining_time |
| $10_{16}$ | |
| $11_{16}$ | (LSB) |
| $12_{16}$ | Number_of_disc_titles (n) |
| $13_{16}$ | Disc_title(0)_length |
| $14_{16}$ | Disc_title(0)_character_code |
| $15_{16}$ | Disc_title(0) |
| $16_{16}$ | |
| $17_{16}$ | |
| ⋮ | ⋮ |
| ⋮ | Disc_title(n - 1)_length |
| ⋮ | Disc_title(n - 1)_character_code |
| ⋮ | Disc_title(n - 1) |
| ⋮ | Media_type_dependent_information_length |
| ⋮ | Media_type_dependent_information |

FIG. 7

| Address offset | Msb | | | | | | | lsb |
|---|---|---|---|---|---|---|---|---|
| $00_{16}$ | 0 | Reserved (4 bits) | | | | Year | Month (4 bits) | |
| $01_{16}$ | Month (4 bits) | | | Day (5 bits) | | | | am/pm |
| $02_{16}$ | Hours (4 bits) | | | | Minutes (6 bits) | | | |
| $03_{16}$ | Minutes (6 bits) | | | Seconds (6 bits) | | | | |

FIG. 8

| Audio Track Object entry_specific_information ||
|---|---|
| Address Offset | Contents |
| $00_{16}$ | Entry_specific_attributes |
| $01_{16}$ | Media_type (MSB) |
| $02_{16}$ | (LSB) |
| $03_{16}$ | (MSB) |
| $04_{16}$ | Track_playback_time |
| $05_{16}$ | |
| $06_{16}$ | (LSB) |
| $07_{16}$ | Number_of_track_titles (n) |
| $08_{16}$ | Track_title(0)_length |
| $09_{16}$ | Track_title(0)_character_code |
| $0A_{16}$ | Track_title(0) |
| | ⋮ |
| | Track_title(n - 1)_length |
| | Track_title(n - 1)_character_code |
| | Track_title(n - 1) |
| | Track_dependent_information_length |
| | Track_dependent_information |

FIG. 9

| Attribute Bit | Attribute Name | Meaning |
|---|---|---|
| 1xxxxxxx | Has_more_attributes | If this bit is set to 1, then the next byte is also an attributes byte. If this bit is 0, then the next byte is as defined for this structure |
| xxxxxxx1 | Recordable | 1 = The disc is recordable<br>0 = The disc is not recordable |
| xxxxxx1x | Write-protected | 1 = This disc is protected<br>0 = This disc is not protected |
| All others | ——— | Reserved for future definition |

FIG. 10

| Media_type (high) | Value | Media_type (low) | Value |
|---|---|---|---|
| CD | $01_{16}$ | CD-DA<br>Video-CD<br>Data | $01_{16}$<br>$02_{16}$<br>$0E_{16}$ |
| MD | $03_{16}$ | Premastered<br>Recordable<br>Hybrid<br>Data | $01_{16}$<br>$02_{16}$<br>$03_{16}$<br>$0E_{16}$ |
| DVD | $05_{16}$ | Movie<br>Data | $01_{16}$<br>$0E_{16}$ |

FIG. 11

| Opcode | Value | Support level (by ctype) | | | Comments |
|---|---|---|---|---|---|
| | | C | S | N | |
| Import Medium | XX$_{16}$ | | | | Put the disc into the subunit |
| Export Medium | XX$_{16}$ | | | | Take the disc out of the subunit |
| Play | XX$_{16}$ | | | | Playback the disc |
| Stop | XX$_{16}$ | | | | Stop the media being played back |
| Pause | XX$_{16}$ | | | | Pause the media |
| Next | XX$_{16}$ | | | | Playback the next playback point scaled by its unique unit |
| Prev | XX$_{16}$ | | | | Playback the previous playback point scaled by its unique unit |
| Access Play | XX$_{16}$ | | | | Playback from the specified point |
| Access Pause | XX$_{16}$ | | | | Pause at the specified point |
| Record | XX$_{16}$ | | | | Record beginning at the current location |

FIG. 12

| | Msb | | | | | | | lsb |
|---|---|---|---|---|---|---|---|---|
| Opcode | \multicolumn{8}{c}{Import Medium (XX$_{16}$)} |
| Operand (0) | \multicolumn{8}{c}{Reserved} |
| Operand (1) | \multicolumn{8}{c}{Status} |
| Operand (2) | | | | | | | | |

FIG. 13

|  | Msb | | | | | | | lsb |
|---|---|---|---|---|---|---|---|---|
| Opcode | \multicolumn{8}{c\|}{Export Medium (XX$_{16}$)} |
| Operand (0) | \multicolumn{8}{c\|}{Reserved} |
| Operand (1) | \multicolumn{8}{c\|}{Status} |
| Operand (2) | | | | | | | | |

FIG. 14

|  | Msb | | | | | | | lsb |
|---|---|---|---|---|---|---|---|---|
| Opcode | \multicolumn{8}{c\|}{Play (XX$_{16}$)} |
| Operand (0) | \multicolumn{8}{c\|}{Subfunction} |

FIG. 15

|  | Msb | | | | | | | lsb |
|---|---|---|---|---|---|---|---|---|
| Opcode | \multicolumn{8}{c\|}{Stop (XX$_{16}$)} |
| Operand (0) | \multicolumn{8}{c\|}{Reserved} |

FIG. 16

| | Msb | | | | | | | lsb |
|---|---|---|---|---|---|---|---|---|
| Opcode | | | | Pause (XX$_{16}$) | | | | |
| Operand (0) | | | | Reserved | | | | |

FIG. 17

| | Msb | | | | | | | lsb |
|---|---|---|---|---|---|---|---|---|
| Opecode | | | | Next (XX$_{16}$) | | | | |
| Operand (0) | | | | Measurement_unit | | | | |
| | | | | Count | | | | |

FIG. 18

| | Msb | | | | | | | lsb |
|---|---|---|---|---|---|---|---|---|
| Opecode | | | | Prev (XX$_{16}$) | | | | |
| Operand (0) | | | | Measurement_unit | | | | |
| | | | | Count | | | | |

FIG. 19

|           | Msb |      |       |        |      |    | lsb |
|-----------|-----|------|-------|--------|------|----|-----|
| Opcode    | \multicolumn{7}{c|}{Access Play (XX$_{16}$)} |
| Operand (0) | \multicolumn{7}{c|}{Drive_number} |
| Operand (0) | \multicolumn{7}{c|}{Unit} |
| Operand (0) | | | | | | | |
| Operand (0) | | | | | | | |
| Operand (0) | | | | | | | |
| Operand (0) | | | | | | | |
| Operand (0) | | | | | | | |

FIG. 20

|           | Msb |   |   |   |   |   |   | lsb |
|-----------|-----|---|---|---|---|---|---|-----|
| Opcode    | Access Pause (XX$_{16}$) |
| Operand (0) | Drive_number |
| Operand (0) | Unit |
| Operand (0) | |

FIG. 21

MODEL AND COMMAND SET FOR AN AV/C-BASED DISC MEDIA PLAYER RECORDER

This application application claims the benefit of the earlier filed provisional application Ser. No. 60/054,258 filed on Jul. 30, 1997.

FIELD OF THE INVENTION

The field of the present invention pertains to audio-video systems. More particularly, the present invention pertains to interfacing audio visual media devices via an IEEE 1394 bus using industry standard AV/C protocols.

BACKGROUND OF THE INVENTION

A typical home audiovisual equipment set up includes a number of components. For example, a radio receiver, a CD player, a pair of speakers, a television, a VCR, a tape deck, and alike. Each of these components are connected to each other via a set of wires. One component is usually the central component of the home audiovisual system. This is usually the radio receiver, or the tuner. The tuner has a number of specific inputs for coupling the other components. The tuner has a corresponding number of control buttons or control switches which provide a limited degree of controllability and interoperability for the components. The control buttons and control switches are usually located on the front of the tuner. In many cases, some, or all, of these buttons and switches are duplicated on a hand held remote control unit. A user controls the home audiovisual system by manipulating the buttons and switches on the front of the tuner, or alternatively, manipulating buttons on the hand held remote control unit.

This conventional home audiovisual system paradigm has become quite popular. As the number of new consumer electronics devices for the home audiovisual system have grown and as the sophistication and capabilities of these devices have increased, a number of problems with the conventional paradigm have emerged. One such problem is incompatibility between devices in the home audiovisual system. Consumer electronic devices from one manufacturer often couple to an audiovisual system in a different manner than similar devices from another manufacturer.

For example, a multi-disc-type player made by one manufacturer may not properly couple with a television made by another manufacturer, and thus may not allow full access to all of it's capabilities. For example, the multi-disc-type player might not incorporate hardware (e.g., specific inputs and outputs) which enables the more sophisticated functions of the multi-disc-type player. As such, these functions may not be usable with simpler, less sophisticated televisions or cable decoders.

Home AV systems which include multi-disc-type player devices are particularly problematic because of the wide variety of information the multi-disc-type player is able to contain and access. For example, there are several multi-disc-type compact disc players on the market that can support CDs, DVDs, and CD-ROMs. This problem may be made even more difficult given the fact that there may be no intuitive, readily usable way to access the various tracks with any other remote control (e.g., the tuner's remote control) of the home AV system.

While the emergence of networking and interface technology (e.g., IEEE 1394 serial communication bus and the wide spread adoption of digital systems) offers prospects for correcting the above problems, there is still no coherent, open, extensible architecture which can provide for intelligent content navigation and selection with multi-disc-type player devices. There is no system for keeping a user informed by providing status reporting and notification between devices within a home AV system. As IEEE 1394 technology spreads across product lines) it is necessary to define logical models and command sets for various devices or functional groups such as VCR's and multi-disc players. As the aggregate amount of media content available to users geometrically increases, as is the case with multi-disc-type players, providing a standardized means of flexibly and efficiently accessing the media content becomes essential.

SUMMARY OF THE INVENTION

Thus, what is required is a device model which is disc media type independent and thereby supports any type of disc media (CD's, MiniDiscs, etc.). What is required is a model which supports enhancements to the AV/C protocol for content navigation and selection, providing both a detailed and a general abstraction of content discovery and description, and allowing for a range of controllers (from very simple to very complex) to make use of its features. What is required is a model that supports status reporting and notification mechanisms so that controllers are aware of what is occurring within the device, and thus keep the user informed. This is especially important in a distributed network environment where the device may be in a closet or a different room of the house from the controller/user. What is further required is a logical model and command set for a Disc player/recorder mechanism for multi-disc-type players capable of storing vast amounts of media content. The required model and command should allow any interested entity to navigate the contents of the media in the drive, to access the contents (such as the selection of a track on the disc), and to monitor the status of the drive. The present invention provides a method and system which satisfies the above requirements.

In a typical embodiment, such as, for example, a home audio visual network including a plurality of devices coupled via an IEEE 1394 bus, the present invention comprises a multi-disc-type media player for playing a plurality of media item types. A media drive mechanism is included within the multi-item-type media player and is configured to play or record the media item type stored within the multi-item media player. A built-in computer system is included within the multi-item media player. A software based media player model executes on the computer system, and in turn, causes the computer system to implement a method of accessing the media drive mechanism. In so doing, the computer system interfaces with a plurality of devices coupled to the multi-item media player via an IEEE 1394 communications link of an IEEE 1394 based network and provides a standardized command set for the media drive mechanism. The media player model provides a set of standardized commands that allow the plurality of devices on the network to access the media drive mechanism and thereby access the installed media item and control the functionality of the media drive mechanism.

In this manner, the present invention provides a model which is media type independent and thereby supports any type of disc media (CD's, MiniDiscs, etc.). The model of the present invention supports enhancements to the AV/C protocol for content navigation and selection, providing both a detailed and a general abstraction of content discovery and description, and allowing for a range of controllers (from very simple to very complex) to make use of its features. In addition, the present invention includes support for status reporting and notification mechanisms so that controllers are aware of what is occurring within the device, and thus keep the user informed.

The model of the present invention supports new enhancements to the well known AV/C protocol for content navigation and selection, providing both a detailed and a general abstraction of content discovery and description, allowing for a range of controllers (from very simple to very complex) to make use of its features.

The present invention defines a logical model and command set for a disc player/recorder mechanism. The model and command set allow any interested entity (such as, for example, a receiver/amplifier) to navigate the contents of the media in the drive, to access the contents (such as the selection of a track on the disc), and to monitor the status of the drive.

The present invention provides these benefits within the context of IEEE 1394 based home audio visual networks. The present invention defines a software based logical model and command set for a disc media player-recorder which is media type independent. The model of the present invention supports any type of disc media (CD's, MiniDiscs, LaserDiscs, etc.). It provides a general content description mechanism, with the ability to specialize the data structures based on the specific details of the media which happens to be installed at the moment. The model does not impose any restrictions on a disc subunit based on any particular kind of media, but it does support the various real-world restrictions that might occur (such as a disc being write-protected so that it cannot be modified).

The model of the present invention supports status reporting and notification mechanisms so that controllers may always be aware of what is going on in the device, and thus keep the user informed. This is especially important in a distributed network environment where the device may be in a closet or a different room of the house from the controller/user.

Additionally, the model of the present invention supports products that may choose to be only media players or those which may be both players and recorders (herein after referred to as player-recorders). However, it should be appreciated that the model of the present invention can function as a mere player as opposed to a player-recorder.

The media player-recorder subunit model of the present invention is defined by a specification, which in turn, defines several data structures for media type description (how to describe a compact disc, a DVD disc, etc.), the contents of the media (titles for each track on a disc, the duration of each track, etc.), and for status reporting and notification. In accordance with the present invention, these data structures could be modified in any number of ways to include or exclude various pieces of information which may or may not be available depending on the media and the capabilities built into the corresponding drive mechanism hardware and software. For example, a designer may choose to leave some portions of the specification of the present invention unimplemented in order to design a device which is a media recorder and not a player.

BRIEF DESCRIPTION OF THE DRAWINGS

The present invention is illustrated by way of example and not by way of limitation, in the figures of the accompanying drawings and in which like reference numerals refer to similar elements and in which:

FIG. 2 shows a table illustrating a disc subunit identifier descriptor in accordance with one embodiment of the present invention.

FIG. 3 shows a table illustrating a $disc_{13}$ subunit_dependent_information in accordance with one embodiment of the present invention.

FIG. 4 shows a table illustrating the format of the media type specification in accordance with one embodiment of the present invention.

FIG. 5 shows a table illustrating the disc_type field from the table of FIG. 4.

FIG. 6 shows a table illustrating two list types in accordance with one embodiment of the present invention.

FIG. 7 shows a table illustrating the format of the AudioTrack List_specific_information field from the table of FIG. 6.

FIG. 8 shows a table illustrating a last_update field in accordance with one embodiment of the present invention.

FIG. 9 shows a table illustrating the format of an audio track entry_specific_information field of an audio track object of the present invention.

FIG. 10 shows a table illustrating the entry_specific_attributes field from the table of FIG. 9 in greater detail.

FIG. 11 shows a table illustrating the media_type field in accordance with one embodiment of the present invention.

FIG. 12 shows a table illustrating the drive subunit commands of the present invention.

FIG. 13 shows a table illustrating the import medium command from the table of FIG. 12.

FIG. 14 shows a table illustrating the export medium command from the table of FIG. 12.

FIG. 15 shows a table illustrating the play command from the table of FIG. 12.

FIG. 16 shows a table illustrating the stop control command from the table of FIG. 12.

FIG. 17 shows a table illustrating the pause control command from the table of FIG. 12.

FIG. 18 shows a table illustrating the next control command from the table of FIG. 12.

FIG. 19 shows a table illustrating the prev control command from the table of FIG. 12.

FIG. 20 shows a table illustrating the access play control command from the table of FIG. 12.

FIG. 21 shows a table illustrating the access pause control command from the table of FIG. 12.

DETAILED DESCRIPTION OF THE INVENTION

Figure 1A:
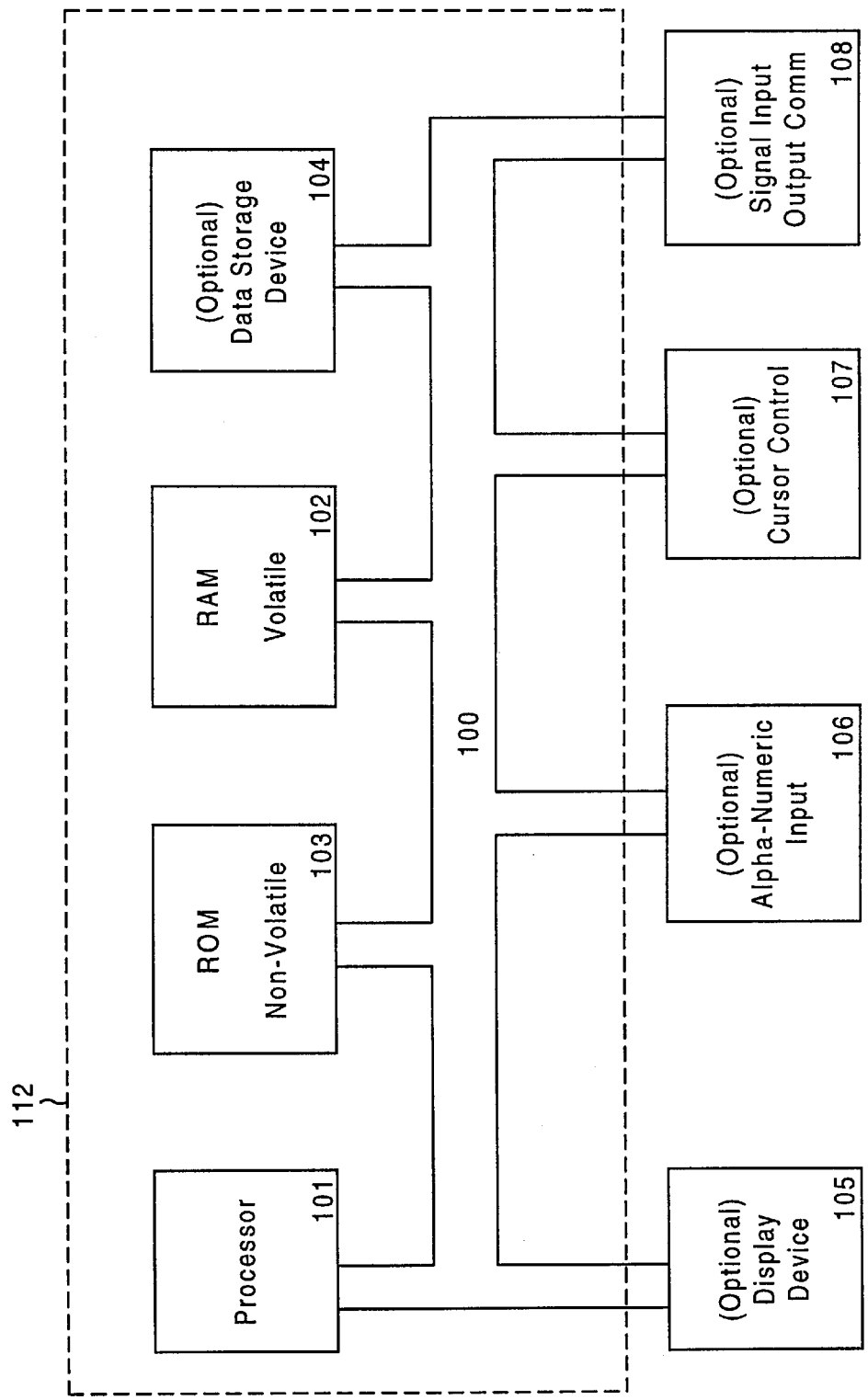
FIG. 1A shows a computer system environment of the present invention.

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The present invention provides a device model which is disc media type independent and thereby supports any type of disc media (CD's, MiniDiscs, etc.). The present invention provides a model which supports enhancements to the AV/C protocol for content navigation and selection, providing both a detailed and a general abstraction of content discovery and description, and allowing for a range of controllers (from very simple to very complex) to make use of its features. The model of the present invention supports status reporting and notification mechanisms so that controllers are aware of what is occurring within the device, and thus keep the user informed. This capability is especially important in a distributed IEEE-1394 network environment where the device may be located away from the controller/user. In addition, the present invention provides a software based model and command set for a Disc player/recorder mechanism for multi-disc-type players capable of storing vast amounts of media content, thereby allowing any interested entity to navigate the contents of the media in the drive, to access the contents (such as the selection of a track on the disc), and to monitor the status of the drive. The present invention and its benefits are further described below.

NOTATION AND NOMENCLATURE

Some portions of the detailed descriptions which follow are presented in terms of procedures, steps, logic blocks, processing, and other symbolic representations of operations on data bits within a computer memory. These descriptions and representations are the means used by those skilled in the data processing arts to convey most effectively the substance of their work to others skilled in the art. A procedure, computer executed step, logic block, process, etc., are here, and generally, conceived to be self-consistent sequences of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing," "computing," "translating," "instantiating," "determining," "displaying," "recognizing," or the like, refer to the action and processes of a computer system, or similar electronic computing device, that manipulates and transforms data represented as physical (electronic) quantities within the computer system's registers and memories into other data similarly represented as physical quantities within the computer system registers or memories or other such information storage, transmission, or display devices.

COMPUTER SYSTEM ENVIRONMENT

Refer to FIG. 1A which illustrates a computer system 112. Within the following discussions of the present invention, certain processes and steps are discussed that are realized, in one embodiment, as a series of instructions (e.g., software program) that reside within computer readable memory units of system 112 and executed by processors of system 112. When executed, the instructions cause the computer system 112 to perform specific actions and exhibit specific behavior which is described in detail to follow.

In general, computer system 112 used by the present invention comprises an address/data bus 100 for communicating information, one or more central processors 101 coupled with the bus 100 for processing information and instructions, a computer readable volatile memory unit 102 (e.g., random access memory, static RAM, dynamic, RAM, etc.) coupled with the bus 100 for storing information and instructions for the central processor(s) 101, a computer readable non-volatile memory unit 103 (e.g., read only memory, programmable ROM, flash memory, EPROM, EEPROM, etc.) coupled with the bus 100 for storing static information and instructions for the processor(s) 101. System 112 can optionally include a mass storage computer readable data storage device 104 such as a magnetic or optical disk and disk drive coupled with the bus 100 for storing information and instructions. Optionally, system 112 can also include a display device 105 coupled to the bus 100 for displaying information to the computer user, an alphanumeric input device 106 including alphanumeric and function keys coupled to the bus 100 for communicating information and command selections to the central processor(s) 101, a cursor control device 107 coupled to the bus for communicating user input information and command selections to the central processor(s) 101, and a signal input/output device 108 coupled to the bus 100 for communicating messages, command selections, data, etc. to and from processor(s) 101.

Figure 1B:
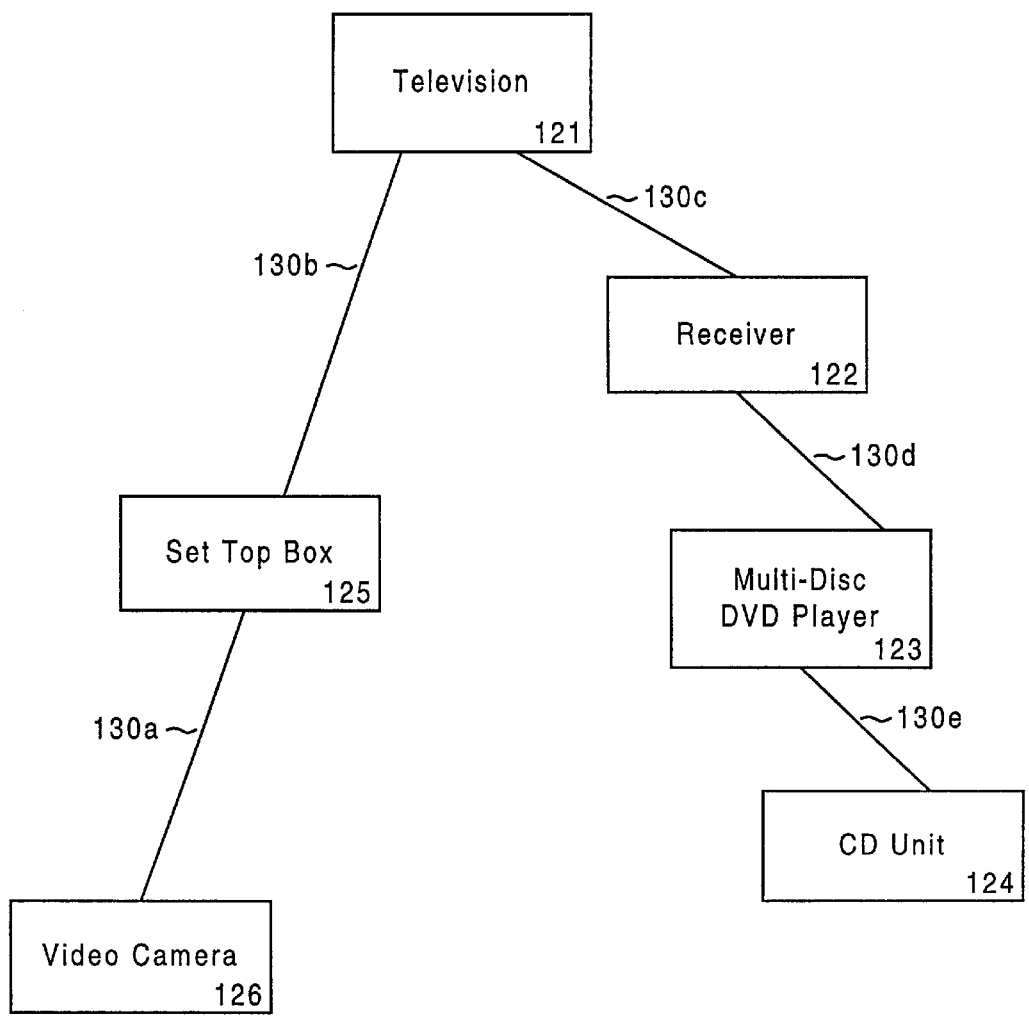
FIG. 1B shows a home audio visual network in accordance with one embodiment of the present invention.

With reference now to FIG. 1B, a home audio visual network 120 in accordance with one embodiment of the present invention is shown. Network 120 includes 6 devices, a television 121, a receiver 122, a multi-disc-type player/recorder 123, a CD unit 124, a set top box 125, and a video camera 126. Each of the devices 121–126 are communicatively coupled via respective IEEE 1394 bus links 130a through 130e to form a single network, wherein each device on the network can communicate with any other device on the network (e.g., in accordance with well known IEEE 1394 bus protocols). While network 120 is shown including 6 devices, it is understood that network 120 is suited to include any number of devices up to the physical limits of the bus technology (e.g., 63 devices for IEEE 1394).

The IEEE 1394 serial bus used by network 120 of FIG. 1 is a high-speed bus architecture for interconnecting digital devices thereby providing a universal input/output connection. The IEEE 1394 standard defines a digital interface for the applications thereby eliminating the need for an application to covert digital data to analog data before it is transmitted across the bus. Correspondingly, a receiving application receives digital data from the bus, not analog data, and therefore is not required to covert analog data to digital data. The cable required by the IEEE 1394 standard is very thin in size compared to other bulkier cables used to connect such devices. Devices can be added to and removed from an IEEE 1394 bus while the bus is active. If a device is so added or removed, the bus automatically reconfigures itself for transmitting data between the then existing nodes.

A node is considered a logical entity having a unique address on the bus structure. Each node provides an identification ROM, a standardized set of control registers and its own address space.

The IEEE 1394 communication standard of network 120 of FIG. 1B supports isochronous data transfers of digital encoded information. Isochronous data transfers are real-time transfers which take place such that the time intervals between significant instances have the same duration at both the transmitting and receiving applications. Each packet of data transferred isochronously is transferred in its own time period. An example of an application for the transfer of data isochronously is from a set top box 125 to a television 121. The set top box 125 receives the video stream from a cable company and divides the stream into discrete packets. The set top box 125 then transfers each packet, representing the images and sounds recorded over a limited time period, during that time period, for display by the television 121. The IEEE 1394 standard bus architecture provides multiple channels for isochronous data transfers between applications. Specifically, a six bit channel number is broadcast with the data to ensure reception by the appropriate application. This allows multiple applications to simultaneously transmit isochronous data across the bus structure. Asynchronous transfers are traditional data transfer operations which take place as soon as possible and transfer an amount of data from a source to a destination.

It should be appreciated that the present invention is equally well suited for home audio visual networks based upon other well known network or bus standards besides IEEE 1394. Such standards include, for example, ethernet, universal serial bus, token ring, and the like. Accordingly, the IEEE 1394 structure of network 120 is shown and described herein as an example bus architecture only.

As described above, the present invention provides a software data structure which abstracts the functionality of a device on the network and provides a standardized method and system for interacting with the device and controlling, using, invoking, etc., the functionality of the device. Particularly, the present invention provides a standardized data structure for interacting with disc-based media player/recorders (e.g., multi-disc-type player 123) and other such media devices. This data structure is referred to herein as a "model". As its name implies, a model in accordance with the present invention abstracts the features and functionality of a device, thereby providing a means of interacting with the device which is media type independent and which is compatible with a wide range of "controller devices", such as, for example, receiver 122 or set top box 125. The device model of the present invention is instantiated within a computer system which is typically embedded within the device itself. Multi-disc-type player 123 and its embedded computer system 112 are described in FIG. 1C below.

Figure 1C:
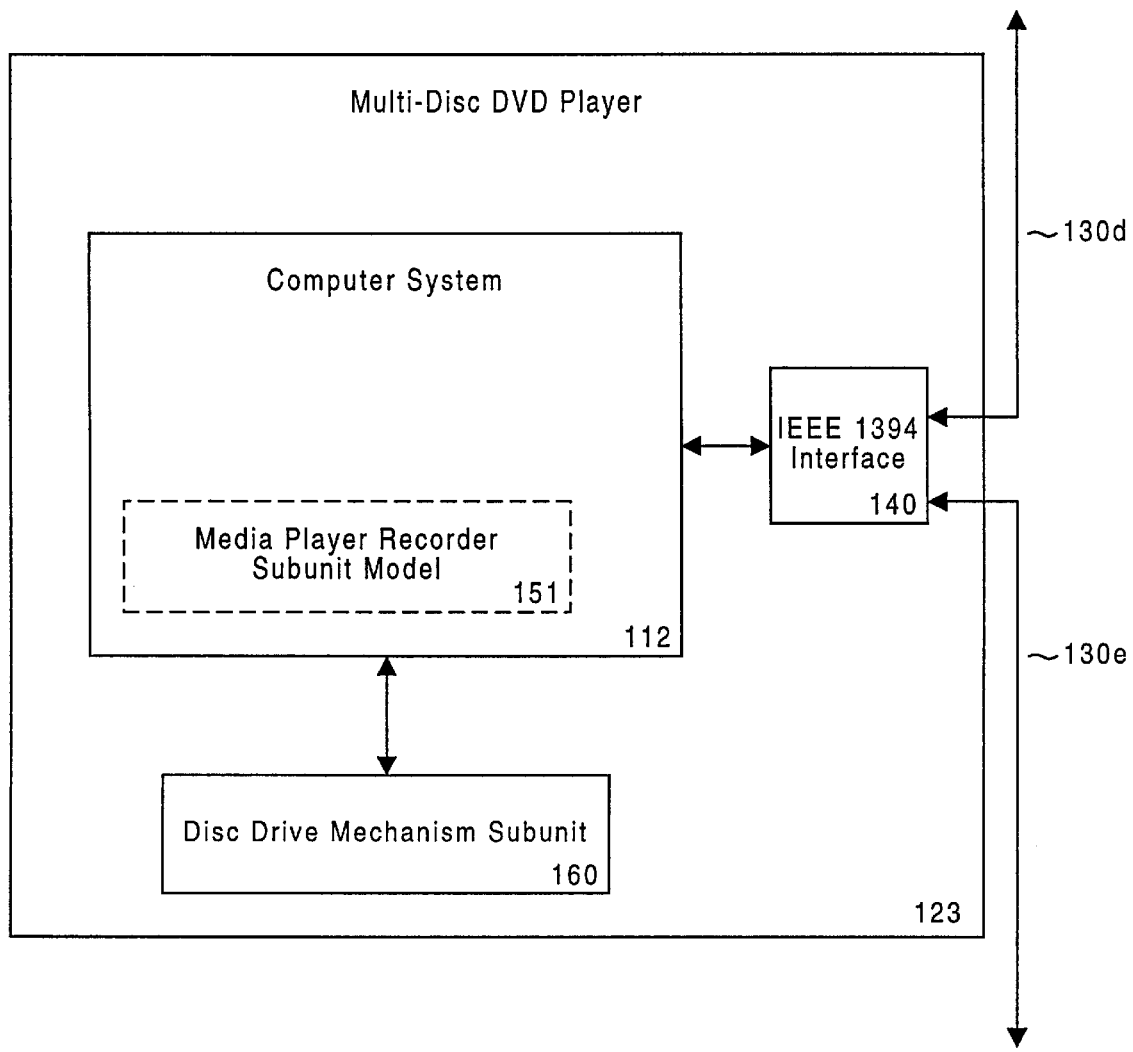
FIG. 1C shows a multi-disc-type player in accordance with one embodiment of the present invention.

FIG. 1C shows a multi-disc-type player/recorder in accordance with one embodiment of the present invention. As described above, multi-disc-type player/recorder includes computer system 112 embedded within its internal electronics. Instantiated within computer system 112 is a media player/recorder subunit model 151 in accordance with one embodiment of the present invention.

With respect to media player/recorder subunit model 151, it provides an abstraction of the functionality and features of the disc drive mechanism subunit 160 specifically. Via computer system 112, the functions, status, etc. of disc drive mechanism 160 are accessed and controlled by other software modules and controllers within network 120. Other devices on network 120 interact with disc drive mechanism 160 by interacting with media player/recorder subunit model 151. An IEEE 1394 interface 140 provides a communications link to the network 120 via link 130d and 130e.

The disc drive mechanism subunit 160 of the present embodiment can playback or record disc media. There are many kinds of disc media, some which contain audio and video data and others which contain computer data. For example, multi-disc-type player 123 is adapted to play audio visual media (e.g., high quality digital video from DVD discs).

Media player/recorder subunit model 151, in accordance with the present invention, abstracts the features and functionality of disc drive mechanism subunit 160 using well known AV/C protocols. In so doing, media player/recorder subunit model 151 provides a means of interacting with the functionality and features of the disc drive mechanism subunit 160 in a media-type independent manner which is compatible with a wide range of "controller devices", such as, for example, receiver 122 or set top box 125.

For example, media player/recorder subunit model 151 supports status reporting and notification mechanisms so that other controllers (e.g., set top box 125) are aware of what is occurring within the device, and thus keep the user informed. This is especially important in a distributed network environment where, for example the controlling set top box 125 may be in another room of the house.

It should be noted that in the present embodiment (e.g., multi-disc-type player 123) media player recorder subunit model 151 supports audio visual disc media as opposed to computer data media. However, to access the computer data content of a disc as well as the audio visual content, the appropriate computer data protocols and control commands are implemented as well.

Referring still to FIG. 1C, media player recorder subunit model 151 is defined by a specification, which in turn, defines several data structures for media type description (how to describe a compact disc, a DVD disc, etc.), the contents of the media (titles for each track on a disc, the duration of each track, etc.), and for status reporting and notification. It should be noted that these data structures can be modified in any number of ways to include or exclude various pieces of information which may or may not be available depending on the characteristics of a particular media item and the capabilities built into the multi-disc-type player 123 (e.g., the capabilities of disc drive mechanism subunit 160, etc.).

Media player/recorder subunit model 151 supports status reporting and notification mechanisms so that other controllers (e.g., set top box 125) are aware of what is occurring within the device, and thus keep the user informed. This is especially important in a distributed network environment where, for example the controlling set top box 125 may be in another room of the house.

The Media player/recorder subunit model 151 is defined by a technical specification in which the specific implementation is left to the product manufacturer. The media player/recorder subunit model specification of the present invention defines several data structures for media type description (how to describe a compact disc, a DVD disc, etc.) the contents of the media (titles for each track on a disc, the duration of each track, etc.), and for status reporting and notification. These data structures could be modified in any number of ways to include or exclude various pieces of information which may or may not be available depending on the media and the capabilities built into the disc drive mechanism subunit 160.

The software data structure of a typical media player/recorder subunit model of the present invention (e.g., media player/recorder subunit model 151) and one embodiment of a disc drive mechanism subunit (e.g., disc drive mechanism subunit 160) are described below.

Media player/recorder subunit model overview

In a typical application, a media player/recorder subunit model of the present invention is used to implement an AV/C media player/recorder. As described above, an AV/C media player/recorder subunit in accordance with the present embodiment is a stand-alone piece of functionality separate from any specific type of media playing mechanism (e.g., disc drive mechanism 160). The AV/C disc media player/recorder subunit model supports various types of disc media.

It should be appreciated that the model and data structures used for the AV/C media player/recorder subunit model are consistent with those proposed for the AV/C Tuner subunit. The general descriptor structures and commands (e.g., OPEN DESCRIPTOR, READ DESCRIPTOR, WRITE DESCRIPTOR, OBJECT NUMBER SELECT commands and subunit identifier, objects and object lists) are described in the AV/C 3.0 specification. An understanding of the general AV/C enhancements described above is helpful in understanding the AV/C media changer subunit proposal, and as such, the AV/C 3.0 specification is incorporated herein by reference as background material. Therefore, that information is not generally repeated here. As such, only the AV/C media player/recorder subunit model-specific model, structures, commands and implementation profiles are primarily described.

The structure of the media player/recorder subunit model of the present invention As described above, a disc drive mechanism subunit in accordance with the present invention can playback or record disc media. A media player/recorder subunit model in accordance with the present invention abstracts the features and functionality of the disc drive mechanism subunit. In so doing, the media player/recorder subunit model provides a means of interacting with the functionality and features of the disc drive mechanism subunit 160 in a media-type independent, highly compatible manner. To provide these advantages, the media player/recorder subunit model includes software data structures which are typically instantiated within a computer system embedded within a media player device (e.g., computer system 112 of FIG. 1B). These data structures are described in the Figures and discussions below.

Referring now to FIG. 2, a table 200 illustrating a disc subunit identifier descriptor of the media player/recorder subunit present invention. As shown in table 200, the descriptor length field contains the number of bytes used for this descriptor structure. The number_of_root_object_lists field contains the number of object lists directly associated with this subunit. The root_object_list_id_x fields are the ID values for each of the associated object lists. The number_of_root_object_lists field indicates how many of these ID values are present. The manufacturer_dependent_length and manufacturer_dependent_information fields are used for vendor-specific data. The format and contents are completely up to the manufacturer.

FIG. 3 shows a table 300 illustrating a disc_subunit_dependent_information in accordance with one embodiment of the present invention. It should be noted that the attributes_of_subunit_dependent_information field of table 300 is reserved for future definition. As shown in FIG. 3, the number_of_supported_disc_types_field contains the number of different types of discs supported by this subunit. For example, a DVD/CD player would support two disc_types. The disc_type_specification fields are an array of supported (as opposed to installed) disc specification contains both common and type-specific entries.

Referring now to FIG. 4, a table 400 showing the format of the media type specification in accordance with one embodiment of the present invention. As shown in table 400, the disc_type field of the present invention shows the type of disc. The upper byte indicates the medium family, while the lower byte specifies more detailed specifications or its functions. The type_dependent_length contains the number of bytes used by the type_dependent_information field. The type_dependent_information field contains information that is specific to each type of medium supported by the subunit.

FIG. 5 shows a table 500 illustrating the disc_type from table 400 in greater detail. As shown in table 500, the media player/recorder subunit supports various types of discs (e.g., CD-DA, Video CD, data, premastered, etc.).

Object Lists and Objects of the media player/recorder subunit

With reference now to FIG. 6, a table 600 illustrating two list types in accordance with one embodiment of the present invention is shown. Table 600 shows an audio track list field and a video track list field. The audio track list represents an audio disc (CD-DA, MD etc.). The audio track list contains information describing the contents of the disc as a whole (such as the disc title), as well as a collection of objects, each of which represents a single audio track. This list contains information that is obtained by reading the contents of the media. The Audio Track List list_specific_information contains "global" information about the disc. The format of the AudioTrack List_specific_information is described in FIG. 700 below.

FIG. 7 shows a table 700 illustrating the format of the AudioTrack List_specific_information field from table 600. As shown in table 700, the last_update field indicates the time stamp when this list was last modified. If the most significant bit of the last_update field is set to one, the last_update value contains a 27-bit counter which is incremented on each modification of the object list (the lsb of this counter is at address offset $03_{16}$). If the MSB is zero, the last_update field contains a time stamp as shown below in table 800 of FIG. 8.

The disc_total_playback_time field specifies the entire playback time of the disc. This field is formatted as HH:MM:SS:FF, with the hours component (HH) in the most significant byte (MSB). The disc_maximum_recording_capacity field specifies the maximum recording time of the disc. This field is formatted as HH:MM:SS:FF, with the hours component (HH) in the most significant byte (MSB).

The disc_recording_remaining_time field specifies the remaining recording time on the disc. This field is formatted as HH:MM:SS:FF, with the hours component (HH) in the most significant byte (MSB). The number_of_disc_titles field contains the number of disc titles. It is possible that the disc title is provided in several different languages (English, Japanese, etc.).

The disc_title[x]_length field contains the number of bytes used by this disc title. The disc_title[x]_character_code specifies the character code of this disc title. The character code identifies which character set is used to encode the title characters.

Referring still to table 700 of FIG. 7, the disc_title[x] field contains the title of the disc in the specified character code. The media_type_dependent_length field contains the number of bytes used by the media_type_dependent_ information field. The media_type_dependent_information field contains information that is specific to the media_type. At present there is no media_type_dependent_information defined for the currently defined media types. When no information exists, the media_type_dependent_information_length field shall be set to zero and this field shall not exist.

FIG. 8 shows a table 800 illustrating the year bit is 1 when the year is odd and 0 when the year is even. This allows the time stamp mechanism to cover a two-year period. The reader of the time stamp can examine the year bit and the current calendar year (which is presumed to be available elsewhere) to determine if the time stamp represents a change in the current or previous year.

Referring now to FIG. 9, a table 900 illustrating the format of an audio track entry_specific_information field of an audio track object of the present invention is shown. As shown in table 900, the entry_specific_information field contains various track information which describes the content of the disc. The content of the entry_specific_attributes field is shown in greater detail in table 1000 below.

FIG. 10 shows a table 1000 illustrating the entry_specific_attributes field from table 900 in greater detail. As shown in table 1000, the recordable bit indicates whether this particular disc is recordable. The write_protected bit tells whether this recordable disc is protected by a write protect mechanism. This bit is defined only when the recordable bit is 1. When the recordable bit is 0, then this bit shall be set to 0.

FIG. 11 shows a table 1100 illustrating the media_type field in accordance with one embodiment of the present invention. As shown in table 1100, the media_type field indicates the format of the information on the particular media item. The upper byte indicates the media family, while the lower byte specifies more detailed specifications or its functions. The Data type means that this is something other than an AV format (such as CD-ROM).

As shown in table 11, for example, a DVD movie disc would have the value $0501_{16}$. The track_playback_time field contains the total playing time of the track. This field is formatted as HH:MM:SS:FF, with the hours component (HH) in the most significant byte (MSB). The number_of_track_titles field contains the number of titles supplied for this track. As with the disc title, it is possible that each track title may be provided in several different languages. The track_title[x]_character_code specifies the character code of the track title. The track_title[x]_length field contains the number of bytes used by the track title.

The track_title[x] field contains the title of the track, in the specified character code. The track_dependent_information_length field contains the number of bytes used by the track_dependent_information field. The track_dependent_information field contains track-specific information for the disc media.

Disc drive subunit commands

Referring now to FIG. 12, a table 1200 illustrating the drive subunit commands of the present invention is shown. As shown in table 1200, the drive subunit commands include import medium commands, export medium commands, play commands, etc. Except for the record command, each of these commands are further illustrated in the tables of FIGS. 13 through 21.

FIG. 13 shows a table 1300 illustrating the import medium command from table 1200. The import medium command is used to place the medium into the disc drive mechanism subunit.

FIG. 14 shows a table 1400 illustrating the export medium command from table 1200. The export medium command is used to take the medium out of the disc drive mechanism subunit.

FIG. 15 shows a table 1500 illustrating the play command from table 1200. The play command is used to start playback. If a playback start point is specified before this command, playback is started from the beginning of the medium.

FIG. 16 shows a table 1600 illustrating the stop control command from table 1200. The stop control command is used to stop the media being played back.

FIG. 17 shows a table 1700 illustrating the pause control command from table 1200. The pause control command is used to pause the media being played. If this command is used while the media being played, the media is paused at the current playback point. If not, the media is paused at its beginning.

FIG. 18 shows a table 1800 illustrating the next control command from table 1200. The next control command is used to playback the next playback point scaled by a "unique unit".

FIG. 19 shows a table 1900 illustrating the prev control command from table 1200. The prev control command is used to playback the previous playback point scaled by its unique unit.

FIG. 20 shows a table 2000 illustrating the access play control command from table 1200. The access play command is used to play back from the point specified by this command.

FIG. 21 shows a table 2100 illustrating the access pause command from table 1200. The access pause command is used to pause at a particular point specified by the command.

Figure 22:
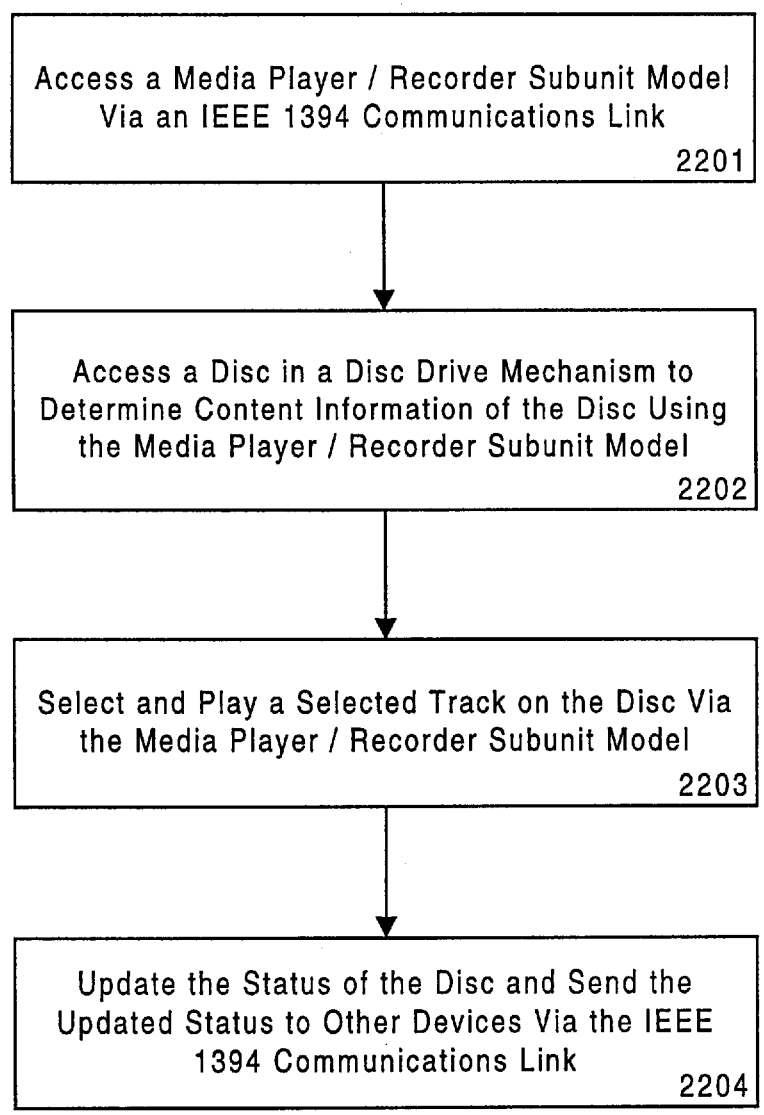
FIG. 22 shows a flow chart of the steps of a process in accordance with one embodiment of the present invention.

With reference now to FIG. 22, a flow chart of the steps of a process 2200 in accordance with one embodiment of the present invention is shown. Process 2200 is an exemplary interface process between a multi-disc-type player/recorder and other devices on a home audio visual network. The interface process is implemented via a media player/recorder subunit model in accordance with one embodiment of the present invention (e.g., media player/recorder subunit model 151 of FIG. 1C). The home audio visual network, as described above, is based on IEEE 1394 protocols.

In step 2201 an external device coupled to the home audio visual network accesses a media player recorder subunit model of a multi-disc-type player (e.g., DVD player 123 of FIG. 1C) via an IEEE 1394 communications link. As described above, a controller device (e.g., a receiver/amplifier, set top box, etc.), typically responding to some user input, accesses the multi-disc player by sending standardized messages to the media player/recorder subunit model. The media player/recorder subunit model is instantiated on a computer system embedded within the multi-disc player.

In step 2202, the media player/recorder subunit model, responding to the request from the controller device, accesses a disc in a disc drive mechanism to determine the disc's content information. As described above, the disc drive mechanism interfaces directly with the media player/recorder subunit model and interfaces with other devices via the media player/recorder. The other devices are informed of the disc's content (e.g., number of tracks, the length of the tracks, track titles, etc.) by the media player/recorder subunit model via the IEEE 1394 communications link.

In step 2203, the controller device selects one of the tracks of the disc and plays the selected track. As described above, disc drive mechanism commands are defined by the media player/recorder subunit model. Using these commands, the controller device assesses the functions of the disc drive mechanism subunit. It should be noted the full functionality of the disc drive mechanism subunit is available via the commands. For example, the controller could in the same manner send a "record" command, "fast forward" command, "pause" command, or the like.

In step 2204, after implementing the command on the disc drive mechanism, the media player/recorder subunit updates the status of the disc drive mechanism and the status of the disc being played. The status information includes, for example, the particular track being played, the amount of time remaining on the track, and the like. The updated status is then sent to the controller device and other devices on the network via the IEEE 1394 communications link.

Thus, the present invention provides a device model which is disc media type independent and thereby supports any type of disc media (CD's, MiniDiscs, etc.). The present invention provides a model which supports enhancements to the AV/C protocol for content navigation and selection, providing both a detailed and a general abstraction of content discovery and description, and allowing for a range of controllers (from very simple to very complex) to make use of its features. The model of the present invention supports status reporting and notification mechanisms so that controllers are aware of what is occurring within the device, and thus keep the user informed. This capability is especially important in a distributed IEEE-1394 network environment where the device may be located away from the controller/user. In addition, the present invention provides a software based model and command set for a Disc player/recorder mechanism for multi-disc-type players capable of storing vast amounts of media content, thereby allowing any interested entity to navigate the contents of the media in the drive, to access the contents (such as the selection of a track on the disc), and to monitor the status of the drive.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to utilize the invention and various embodiments with various modifications as are suited to the particular use contemplated. It is intended that the scope of the invention be defined by the Claims appended hereto and their equivalents.

What is claimed is:

1. In a home audio visual network including a plurality of devices coupled via an IEEE 1394 bus, a system for accessing a media player mechanism of a multi-item-type media player, comprising:

a multi-item-type media player for storing a media item and playing the media item;

a media player mechanism within the multi-item-type media player, the media player configured to play the media item;

a computer system within the multi-item-type media player, the computer system coupled to the media player mechanism, the computer system having a processor coupled to a memory; and a software based media player model executing within the computer system, the media player model comprised of computer readable code which when executed by the processor cause the computer system to perform a method for accessing the media player mechanism, the method comprising the computer system performing the steps of:

interfacing with a plurality of devices coupled to the multi-item media player via an IEEE 1394 communications link of an IEEE 1394 based network;

providing a standardized command set for the media player mechanism to provide a set of standardized commands that allow the plurality of devices to access the media player mechanism such that the plurality of devices can access the information of the installed media item; and providing content discovery functionality for the media item for allowing the plurality of devices to discover the content of the media item prior to accessing the media item.

2. The system of claim 1, wherein the multi-item-type media player is disc-based multi-item media player and wherein the media item is a disc.

3. The system of claim 1 wherein the media player mechanism includes at least one drive configured to play and record the media item.

4. The system of claim 1 wherein the media player model interfaces with the plurality of devices using AV/C protocols, the standardized command set being an extension of the AV/C protocols.

5. The system of claim 4 wherein the computer system further performs the step of providing enhancements to the AV/C protocols for content navigation of the media item by providing a detailed abstraction and a general abstraction of content discovery functionality of the media player mechanism.

6. The system of claim 1 wherein the media player mechanism is configured to play media items from a plurality of different formats.

7. In an IEEE 1394 based home audio visual network including a plurality of devices coupled via respective IEEE 1394 communications links, a media type independent system for accessing a disc drive mechanism of a multi-disc-type media player coupled to the network, comprising:

a multi-disc-type media player configured to store a single media disc;

a disc drive mechanism within the multi-disc-type media player, the disc drive mechanism for playing the media disc;

a computer system within the multi-disc-type media player, the computer system coupled to the disc drive mechanism and the disc drive, the computer system having a processor coupled to a memory; and a software based media player model executing within the computer system, the media player model comprised of computer readable code which when executed by the processor cause the computer system to perform a method for accessing the disc drive mechanism, the method comprising the computer system performing the steps of:

interfacing with a plurality of devices coupled to the multi-disc-type media player via an IEEE 1394 communications link of an IEEE 1394 based network;

providing a standardized command set for the disc drive mechanism to provide a set of standardized commands that allow the plurality of devices to access the disc drive mechanism such that the plurality of devices can access the content of the media disc; and providing content discovery functionality for the media disc for allowing the plurality of devices to discover the content of the media disc prior to accessing the media disc.

8. The system of claim 7 wherein the media player model interfaces with the plurality of devices using AV/C protocols, the standardized command set being an extension of the AV/C protocols.

9. The system of claim 8 wherein the computer system further performs the step of providing enhancements to the AV/C protocols for content navigation of the media disc by providing a detailed abstraction and a general abstraction of content discovery functionality of the disc drive mechanism.

10. The system of claim 7 wherein the disc drive mechanism is configured to both play and record the media disc.

11. The system of claim 7 wherein the media player model includes a disc subunit identifier descriptor software data structure for describing the information content of a media disc.

12. The system of claim 7 wherein the media player model includes a plurality of object list software data structures for describing the tracks of a media disc.

13. The system of claim 12 wherein the object list software data structures includes at least one audio track list or one video track list for cataloging the contents of the media disc.

14. The system of claim 7 wherein the media player model includes command software data structures for controlling the function of the disc drive mechanism.

15. In an IEEE 1394 based home audio visual network including a plurality of devices coupled via respective IEEE 1394 communications links, a method for type independent accessing of a disc drive mechanism of a multi-disc-type media player coupled to the network, comprising:

playing a media disc using a disc drive within a disc drive mechanism;

interfacing a plurality of devices coupled to the multi-disc media player via an IEEE 1394 communications link of an IEEE 1394 based network using a computer system within the multi-disc-type media player, the computer system having a processor coupled to a memory for executing a software based media player model, the media player model comprised of computer readable code which when executed by the processor causes the computer system to perform the steps of:

providing a standardized command set for the disc drive mechanism to provide a set of standardized commands that allow the plurality of devices to access the disc drive mechanism such that the plurality of devices can access the media disc;

interfacing the disc drive mechanism with the plurality of devices using AV/C protocols, the standardized command set being an extension of the AV/C protocols; and providing content discovery functionality for the media disc for allowing the plurality of devices to discover the content of the media disc prior to accessing the media disc.

16. The method of claim 15 wherein the computer system further performs the step of providing enhancements to the AV/C protocols for content navigation and selection for the media disc by providing a detailed abstraction and a general abstraction of content discovery functionality of the disc drive mechanism.

17. The system of claim 15 wherein the media player model interfaces with the plurality of devices using AV/C protocols, the standardized command set being an extension of the AV/C protocols.

18. The system of claim 15 wherein the computer system further performs the step of providing enhancements to the AV/C protocols for content navigation and selection for the media disc by providing a detailed abstraction and a general abstraction of content discovery functionality of the disc drive mechanism.

19. The system of claim 15 wherein the disc drive mechanism is configured to both play and record the media disc.

20. The system of claim 15 wherein the media player model includes a disc subunit identifier descriptor software data structure for describing the information content of a media disc.

21. The system of claim 15 wherein the media player model includes a plurality of object list software data structures for describing the tracks of a media disc.

22. The system of claim 15 wherein the media player model includes command software data structures for controlling the function of the disc drive mechanism.

23. In a home audio visual network including a plurality of devices coupled via an IEEE 1394 bus, a system for accessing a media player means of a multi-item-type media player, comprising:

a means for storing a media item and playing the media item;

a media player means within the multi-item-type media player, the media player means configurable for playing or recording a media item;

a computer system means within the multi-item-type media player, the computer system means coupled to the media drive mechanism; and a software based media player model executing within the computer system means, the media player model comprised of computer readable code which when executed by the processor cause the computer system to perform a method for accessing the media player means, the method comprising the computer system performing the steps of:

interfacing with a plurality of devices coupled to the multi-item-type media player via an IEEE 1394 communications link of an IEEE 1394 based network;

providing a standardized command set for the media drive mechanism to provide a set of standardized commands that allow the plurality of devices to access the media drive mechanism such that the plurality of devices can access the media item; and providing content discovery functionality for the media item for allowing the plurality of devices to discover the content of the media item prior to accessing the media item.

* * * * *